(No Model.)
H. BORSCH.
EYEGLASSES.
No. 329,883. Patented Nov. 10, 1885.
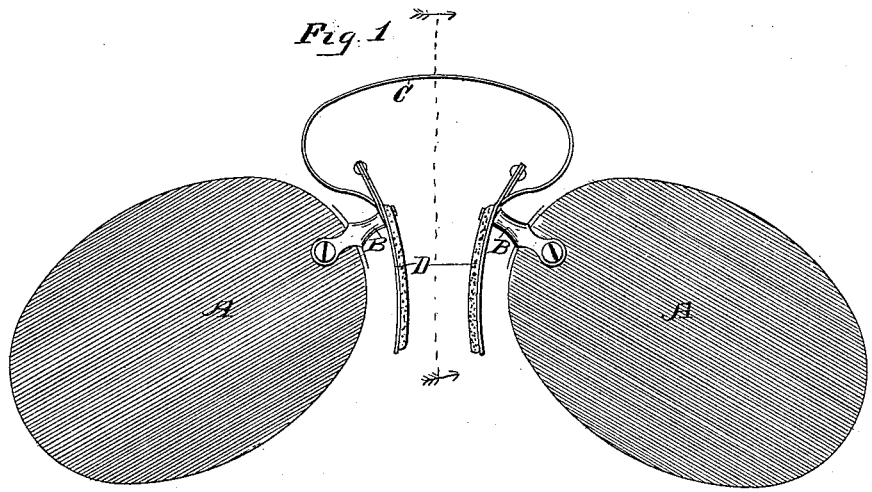
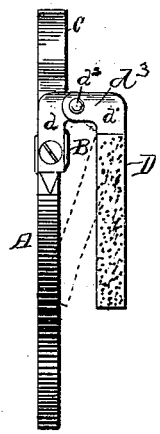
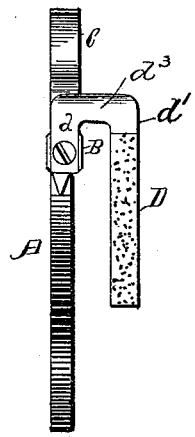
WITNESSES
Will T. Robertson
E. H. Bond
INVENTOR
Henry Borsch
By T. J. W. Robertson
Attorney

United States Patent Office.

HENRY BORSCH, OF CHICAGO, ILLINOIS, ASSIGNOR TO THE AMERICAN OPTICAL COMPANY, OF SOUTHBRIDGE, MASSACHUSETTS.

EYEGLASSES.

SPECIFICATION forming part of Letters Patent No. 329,883, dated November 10, 1885.

Application filed May 15, 1885. Serial No. 165,622. (No model.)

*To all whom it may concern:*

Be it known that I, HENRY BORSCH, a citizen of the United States of America, residing at Chicago, in the county of Cook and State of Illinois, have invented certain new and useful Improvements in Eyeglasses, of which the following is a specification, reference being had therein to the accompanying drawings, in which—

Figure 1 represents an elevation of the face side of a pair of eyeglasses fitted with my improvement; Fig. 2, a side view of one glass and its nose-piece, and Fig. 3 a similar view with a modified form of nose-piece, all on an enlarged scale.

This invention relates to that class of eyeglasses which are provided with spring nose-pieces; and the invention consists in the peculiar combination and construction and arrangement of parts, hereinafter more fully described, and then pointed out in the claims.

A represents the lenses, B the clasps, and C the spring, all of which may be of any approved form.

D represents the nose-pieces, which may be made in two pieces, $d\ d'$, pivoted together at $d^2$, or in one piece, as shown in Fig. 3. In either case the nose-pieces are made of thin spring metal, and preferably faced with cork, which is cemented to said nose-pieces.

By means of the pivot at $d^2$ the nose-piece may be adjusted as desired, as shown in dotted lines in Fig. 2, so as to suit differently-shaped noses.

It will be observed that the nose-piece is of peculiar form, having in addition to the downwardly-turned portion $d'$, which is the nose-piece proper, an extension substantially in the form of an inverted L, one arm, $d$, of which is substantially on the same plane as the lenses, and is used for attaching the nose-piece to the clasp, and the other arm, $d^3$, (which is substantially at right angles to the plane of the lens,) connects the arm $d$ to the nose-piece proper, $d'$. By this construction a very elastic nose-piece is formed, which will adapt itself or can be adapted to any ordinarily-shaped nose, as there is a torsional-spring effect due to the position of the portion $d^3$, which allows of a very large amount of motion of the free end of the nose-piece irrespective of the pivotal connections. It will thus be seen that the horizontal portion $d^3$ is a very important factor of my improvement, as owing to its position at the extreme upper end of the nose-piece a very soft spring action is obtained, due to its torsional effect, and as it carries the nose-piece out of the plane of the lenses it carries the lenses away from the eyes, and, moreover, the joint at $d^2$ allows of this distance being regulated and the adjusting of the nose-pieces to suit different-shaped noses.

By cementing the cork to the face of the nose-piece, instead of sliding it into a pocket or recess formed on the face of the nose-piece, as has heretofore been customary, the nose-piece can be made much more elastic than where the metal of which it is made has to be turned up to form the pocket or recess, and thus my improved eyeglasses can be worn on the most sensitive nose.

I am aware that it has been proposed to secure cork pads to stiff metal nose-pieces, depending for elasticity on the cork alone, and I am also aware that eyeglasses have been provided with nose-pieces composed of flexible supporters hinged to a part of the frame, and also that nose-pieces have been formed of an inclined bar with a curved arm projecting from a point near its middle, and lay no claim to such construction as forming part of my invention.

I am also aware of the Patent No. 217,778, in which pivoted and extensible pieces are shown which are designed to bear on the under surface of the eyebrow to prevent the nose-pieces proper from slipping upward, and I make no claim to anything shown therein, as I regard my invention as being entirely different therefrom and as having a different function, inasmuch as my device is to rest on and press the nose, and is not intended to touch the eyebrows.

What I claim as new is—

1. A nose-piece having two portions, one of which projects upward and is attached to the lens-holder, and the other portion projects downward substantially parallel to the first portion, and is adapted to rest upon the side of the nose, and the two united at their upper ends by a torsion-spring connection, substantially as described.

2. A nose-piece for eyeglasses, having two portions, one of which projects upward and is attached to the lens-holders, and the other portion projects downward substantially parallel to the first portion, and is adapted to rest on side of the nose, the two portions being united at their upper ends by a torsion-spring connection, and the part resting on the nose having its lower end capable of adjustment toward or from the lens, substantially as described.

3. A nose-piece for eyeglasses, having two portions, one of which projects upward and is attached to the lens-holder, and the other portion projects downward substantially parallel to the first portion, and is adapted to rest on side of the nose, and having a cork facing cemented thereto, the two portions being united at their upper ends by a torsion-spring connection, and the part resting on the nose having its lower end capable of adjustment toward or from the lens, substantially as described.

In testimony whereof I affix my signature, in presence of two witnesses, this 13th day of May, 1885.

HENRY BORSCH.

Witnesses:
T. J. W. ROBERTSON,
M. P. CALLAN.